(12) United States Patent
Ross

(10) Patent No.: US 8,807,083 B1
(45) Date of Patent: Aug. 19, 2014

(54) PORTABLE WATER TRAVEL MUG FOR DOGS

(76) Inventor: Gary Ross, Oxnard, CA (US)

( * ) Notice: Subject to any disclaimer, the term of this patent is extended or adjusted under 35 U.S.C. 154(b) by 278 days.

(21) Appl. No.: 13/341,645

(22) Filed: Dec. 30, 2011

(51) Int. Cl.
*A01K 7/00* (2006.01)

(52) U.S. Cl.
USPC .............................. 119/72; 222/207

(58) Field of Classification Search
USPC ............................ 119/72, 51.5, 52.1; 222/207
See application file for complete search history.

(56) References Cited

U.S. PATENT DOCUMENTS

| | | | | |
|---|---|---|---|---|
| 2,715,236 A * | 8/1955 | Tereno | ...................... | 401/151 |
| 3,246,807 A * | 4/1966 | Micallef | ...................... | 222/207 |
| 3,581,953 A * | 6/1971 | Donoghue | ...................... | 222/207 |
| 3,705,668 A * | 12/1972 | Schwartzman | ...................... | 222/207 |
| 3,921,860 A * | 11/1975 | Zackheim | ...................... | 222/207 |
| 4,106,673 A * | 8/1978 | Donoghue | ...................... | 222/207 |
| 4,146,154 A * | 3/1979 | Mastman | ...................... | 222/109 |
| 5,636,592 A * | 6/1997 | Wechsler | ...................... | 119/52.1 |
| 5,809,935 A * | 9/1998 | Kolterman et al. | ...................... | 119/74 |
| 5,960,742 A * | 10/1999 | O'Rourke et al. | ...................... | 119/74 |
| 5,992,702 A * | 11/1999 | Shapiro | ...................... | 222/205 |
| 6,718,911 B2 * | 4/2004 | Greenberg | ...................... | 119/51.5 |
| 7,073,678 B1 * | 7/2006 | Dibdin et al. | ...................... | 220/254.1 |
| 7,490,577 B2 * | 2/2009 | Stephanos | ...................... | 119/74 |
| 7,549,395 B2 * | 6/2009 | Stenberg | ...................... | 119/74 |
| 7,690,329 B2 * | 4/2010 | Parks | ...................... | 119/74 |
| 8,272,351 B2 * | 9/2012 | Hurwitz | ...................... | 119/74 |
| 2008/0087224 A1 * | 4/2008 | Wechsler | ...................... | 119/52.1 |
| 2012/0298045 A1 * | 11/2012 | Wechsler | ...................... | 119/52.1 |

* cited by examiner

*Primary Examiner* — Kristen C Hayes
(74) *Attorney, Agent, or Firm* — Thomas I. Rozsa

(57) ABSTRACT

A portable travel mug and water bowl combination which is used to retain water and dispense water for a dog, to consume and thereafter enable the unconsumed water to be returned to the travel mug. The travel mug is designed to fit into and be retained in a standard car beverage container holder. The combination water retainer and water drinking bowl includes a drinking bowl top which is removably affixed to the water retaining vessel. The water retaining vessel is a plastic squeeze bottle retained in an outer shell which has a pair of oppositely disposed cutout sections by which the squeeze bottle can be squeezed by fingers to cause water to flow through a straw and out of the neck of the bottle and into the water bowl.

25 Claims, 5 Drawing Sheets

PORTABLE WATER TRAVEL MUG FOR DOGS

BACKGROUND OF THE INVENTION

1. Field of the Invention

The present invention relates to the field of providing drinking water for a dog, especially when traveling with the dog in a vehicle such as a car, truck, SUV, camper, etc.

2. Description of the Prior Art

It is very common for people to travel with a dog in a vehicle such as a car. Sometimes the dog is being taken to a veterinarian, but many times the dog is a constant companion and therefore must ride in the car with the owner. Dogs, just as humans, must have access to water, especially in summer heat.

Beginning at least as early as the 1980s, every car has a place to retain a drinking vessel, a drink holder for coffee, or a water bottle. Most vehicles have side-by-side or front and back drink vessel holders. A vehicle commonly has only one occupant who is the driver and therefore, there is an extra drink holder adjacent the driver's seat.

Most dogs will travel in the front seat of a car if they are only traveling with the owner. The owner can have a cup of coffee, tea or a bottle of water in a drink holder. However, there is no convenient retainer to retain drinking water for the dog.

One solution in the prior art is a travel water bowl which is placed on the floor of the vehicle. However, if the water placed in the travel bowl is not entirely consumed, normal driving will cause the water to splash and cause water to splash onto the car's carpet. This is not very practical.

Alternatively, the driver can stop the vehicle, pour water into a bowl, and after the dog has finished drinking, throw out the unfinished water. This may be illegal in some places and certainly is very inconvenient.

There is a significant need for a convenient and practical way to carry water to enable a dog to have a drink of water while a person is driving a car or after the car is pulled over for a stop and provide a means to safely store any water not consumed by the dog.

SUMMARY OF THE INVENTION

The present invention is a portable travel mug and water bowl combination which is used to retain water and dispense water for a dog to consume and thereafter enable the unconsumed water to be returned to the travel mug. The present invention is designed to fit into and be retained in standard car beverage container holders. The device is also designed to be aesthetically pleasing so that it can even, be used in luxury vehicles.

The combination water retainer and water drinking bowl includes a drinking bowl top which is affixed to the water retaining vessel. In a preferred embodiment, the water retaining vessel is a plastic squeeze bottle which, by way of example, can retain approximately sixteen (16) ounces of liquid such as water. The plastic squeeze bottle is preferably retained in an outer shell such as a stainless steel or plastic mug into which the plastic squeeze bottle is securely retained. The outer shell will have at least one and preferably a pair of oppositely disposed cutout sections by which the squeeze bottle can be squeezed by fingers to cause water to flow out of the neck of the bottle. For aesthetic purposes, the outer shell or mug can have removable covers to conceal the interior squeeze bottle when not in use to dispense water.

A drinking bowl made of material to match the outer shell is retained to the outer shell by retention means such as mating threads where the exterior top portion of the shell has female threads and an extending exterior lower portion of the bowl has mating male threads. Alternatively, the bottom portion of the bowl can be press fitted into the shell. The bottom of the bowl has an opening which is aligned with the opening in the neck of the plastic squeeze bottle.

A straw is formed to be retained by the neck of the bottle and extends into the bottle and terminates at the location of the opening in the drinking bowl.

The water bowl can have a straight circumferential top or have a top that is at an angle to facilitate drinking from the bowl. The top optionally can have a silicone rim to prevent dripping of water.

When the driver desires to give the dog a drink of water, the driver preferably stops the car by pulling over in a parking lane on a road or pulling off the road on a highway, stopping the car, squeezing the opposite sides of the plastic squeeze bottle so that water flows into the bowl, maintaining the pressure on the squeeze bottle to keep the water in the bowl, enabling the dog to drink as much water as the dog desires, and then releasing the squeeze pressure on the squeeze bottle so that the unconsumed water will be sucked back into the bottle.

The outer mug or shell is designed to fit into a cup retainer in a vehicle so that it can be safely stored when not in use and water will not flow out or splash out of the inner plastic squeeze bottle.

It is therefore an object of the present invention to provide a safe water retaining vessel which can be retained in a cup holder of a vehicle and which retains the water so that it will not splash out.

It is a further object of the present invention to provide a mechanism by which water in the retaining vessel can be caused to be pushed out of the retaining vessel and into a drinking bowl so that a dog can consume the water, and thereafter enable the unconsumed water to be returned to the retaining vessel without having water splashed on any portion of the interior of the vehicle.

It is an additional object of the present invention to provide a retainer for the water retaining vessel which fits into a standard cup holder in a vehicle so that the water retaining vessel can be safely stored during travel and is easily accessible to the driver to enable the driver to provide his/her dog with a drink of water.

It is also an object of the present invention to provide an aesthetically pleasing water retaining vessel which can be used in a luxury vehicle and any other vehicle which has a cup retaining member adjacent the driver's seat.

It is further object of the present invention to provide a means to prevent water from dripping out of the water bowl with no loss of water if the water bowl is inverted.

In an alternative variation, the present invention can include only the interior which is a drinking bowl top which is affixed to a water retaining vessel where in the preferred embodiment, the water retaining vessel is a plastic squeeze bottle which, by way of example, can be approximately a 16-ounce water bottle. A straw is formed to be retained by the neck of the bottle and extends into the bottle and terminates at a location of the opening of the drinking bowl. The water bowl as with the first embodiment is attached directly to the top of the squeeze bottle but in this case, there is no outer shell but it is simply a squeeze bottle attached directly to the water bowl operating on the same principle that water will be squeezed out of the squeeze bottle and into the drinking bowl so that the dog can consume the water and thereafter any unconsumed water will be sucked back into the squeeze bottle when the squeeze pressure is released. In effect, it is a sub-component of the first embodiment of the present invention without the exterior shell.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
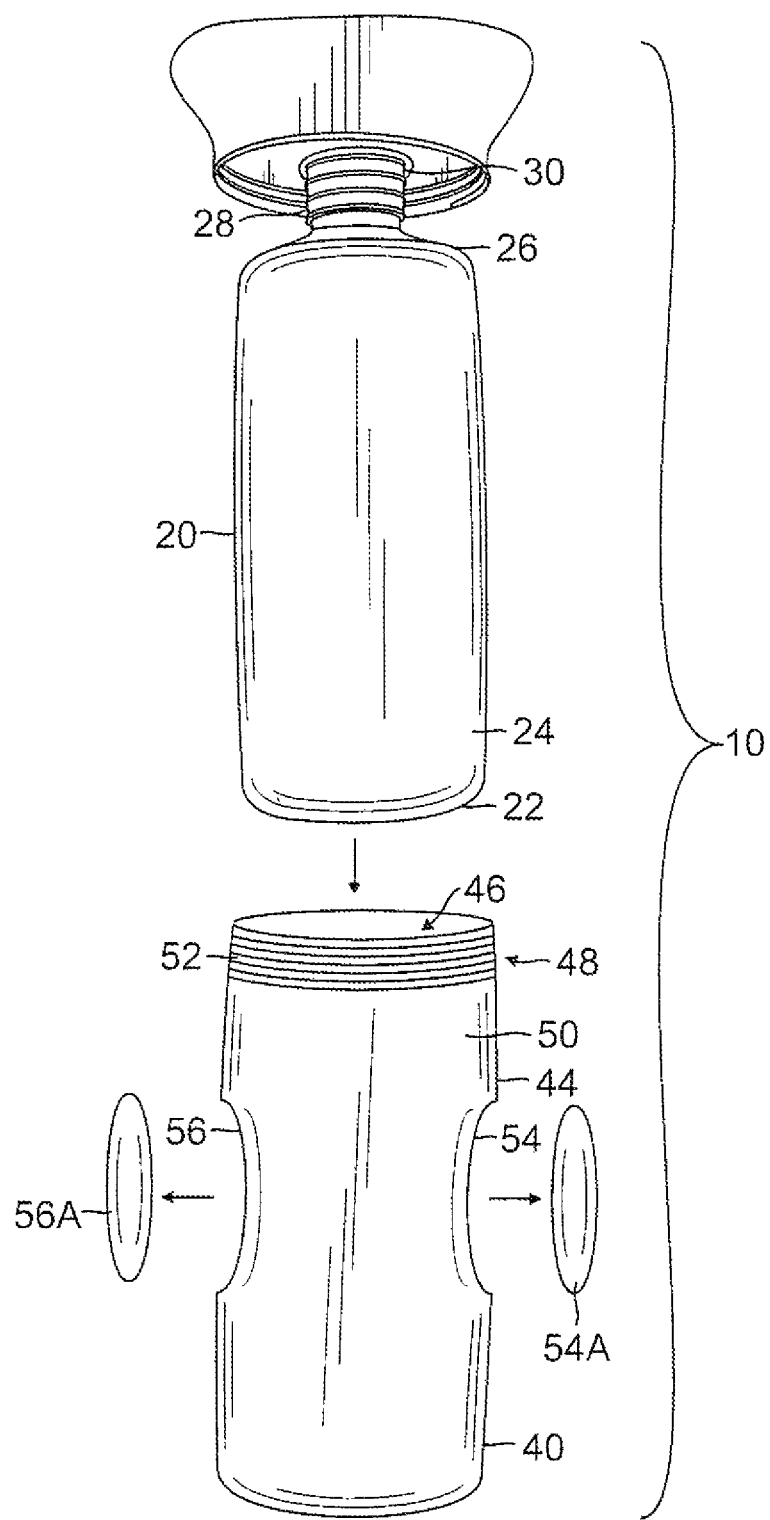
FIG. 1 is an exploded view of the present invention, illustrating the interior plastic water squeeze bottle having a neck affixed to the bottom of the drinking bowl, with a straw retained in the neck of the bottle, the outer shell with the bottle covering members away from the shell, and the water bowl.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 4, the present invention combination water retention bottle and drinking bowl 10 is comprised of an interior squeeze bottle 20 such as a plastic water bottle having a bottom 22 and circumferential wall 24 which terminates in a top wall 26 extending to a neck 28 having a closed top 30 with an opening 32 large enough to retain a straw 34 which is press fit retained in the opening. The straw extends into the interior chamber 36 of the squeeze bottle 20, which interior chamber 36 is surrounded by the bottom 22, circumferential wall 24, top wall 26 and neck 28. The top 26 or the neck 28 can be removably affixed by a press fit or a mating threaded fit so that the squeeze bottle has an opening sufficiently large to be filled with liquid such as water 100.

The squeeze bottle 20 is retained within an outer shell or mug 40 made of material selected from the group consisting of plastic and metal, the shell having an interior chamber 46 into which the plastic squeeze bottle 30 is removably retained in a tight fit manner. The top portion 48 of exterior wall 50 of mug 40 has female threads 52 therein. The top portion of the mug is preferably open. The circumferential sidewall 44 has a pair of oppositely disposed openings 54 and 56 through which the circumferential wall 24 of the plastic squeeze bottle 20 can be squeezed between fingers of a hand. Plastic or rubber covers 54A and 56A are respectively press fit into the openings 54 and 56 to conceal the plastic squeeze bottle 20 when it is not in use. The covers 54A and 56A are attached to the outer wall 40 of the shell 50 so that they are non-removable. The covers 54A and 56A are made of very elastic silicone which will transfer any squeeze through the elastic membrane to the squeeze bottle to avoid the possibility of a finger being cut by any sharp edge of the metal around openings 54 and 56. It will stay on the product to prevent any chance of injury on a sharp edge of the openings 54 and 56.

The drinking bowl 60 has a generally conical shape with a circumferential top 62 descending through a sidewall to a bottom 64 having an opening 66 which matches the opening of the straw 34. A lower extension portion 68 of the bottom exterior wall 69 has interior mating threads 70 which mate with the threads 52 of mug 40.

In use, the plastic squeeze bottle 20 is filled with liquid, usually water, and closed and then placed into the outer shell or mug 40 and the drinking bowl 60 screwed into place so that its opening 66 is aligned with the straw 34. The covers 54A and 56A are in place and the outer shell or mug 40 is fit into a cup holder in a vehicle.

When it is desired to use the combination water retention bottle and drinking bowl 10, the mug 40 is removed from the cup holder of the vehicle and the covers 54A and 56A are removed to exposed the circumferential wall 24 of the plastic squeeze bottle 20 and the plastic circumferential wall is squeezed by fingers of a hand extending into the openings 54 and 56 so that water 100 flows through the straw 34 into the drinking bowl 60 and pressure on the squeeze bottle is maintained to retain the water 100 in the drinking bowl 60 until the desired amount of water 100 is consumed by the dog and thereafter the pressure on the squeezed bottle is released and the remaining water is sucked back into the plastic squeeze bottle.

Optionally, a plug 80 can be used to enclose the opening 66 and straw 34.

Figure 4:
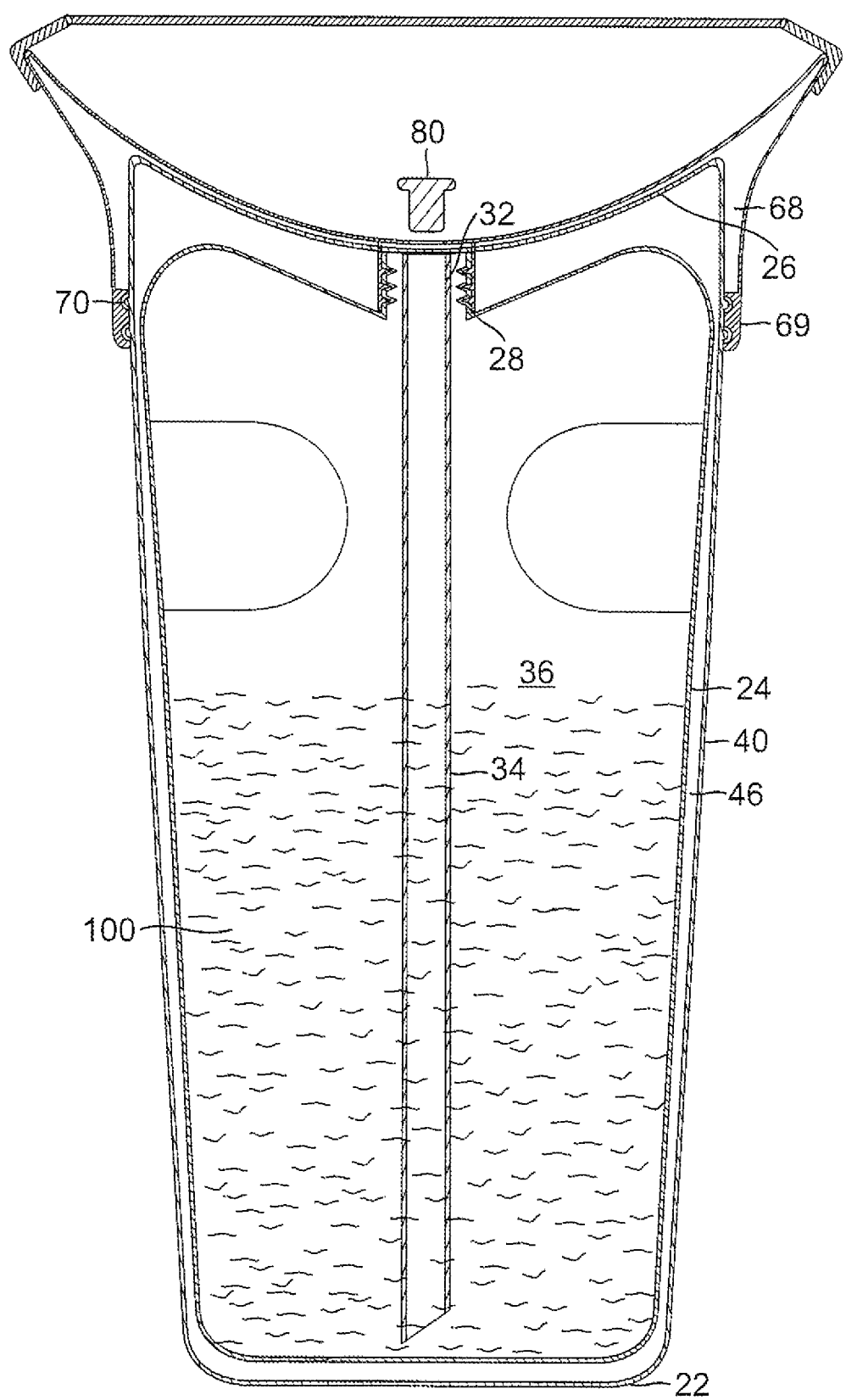
FIG. 4 is a cross-sectional view taken along line 4-4 of FIG. 3.
Figure 5:
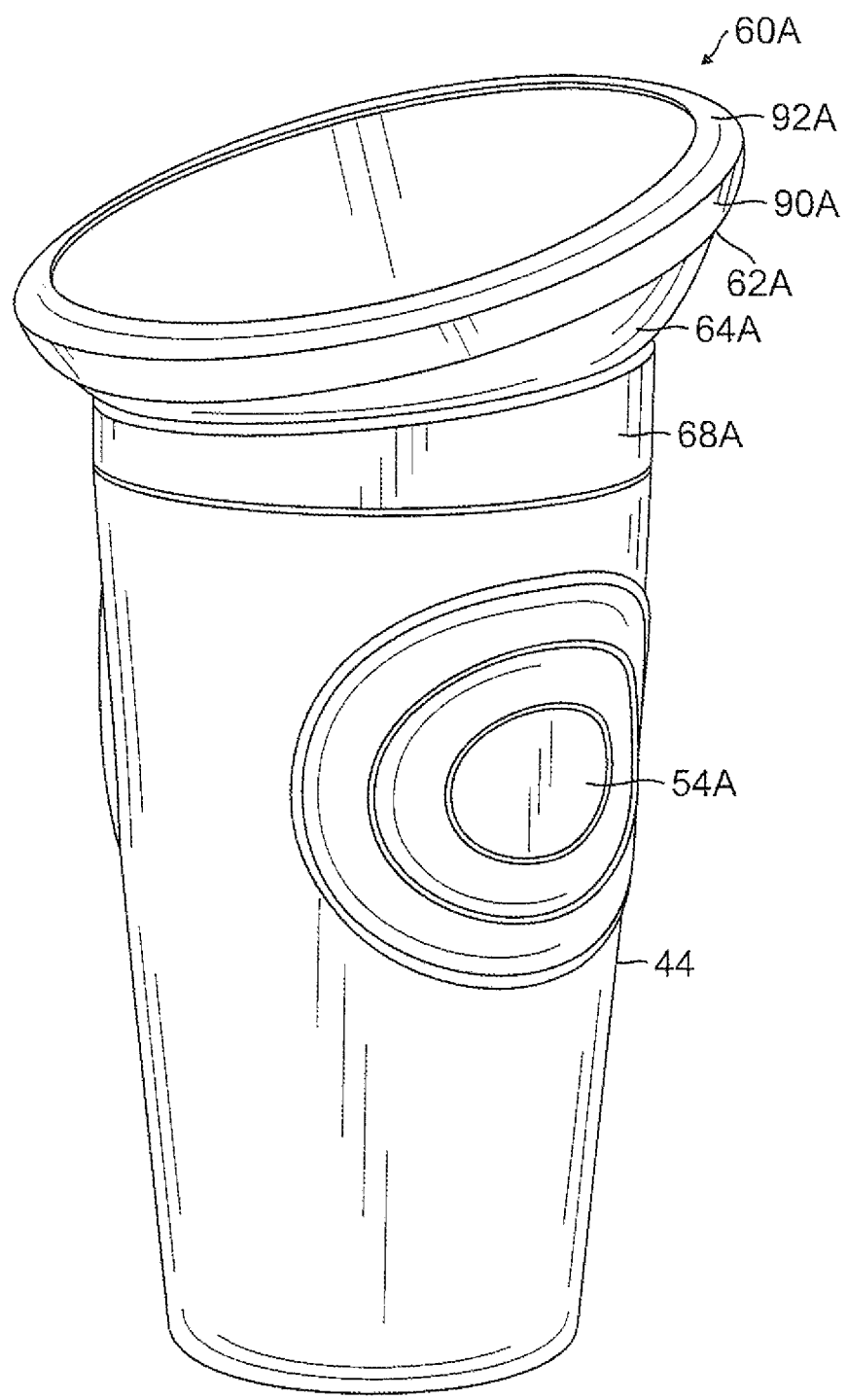
FIG. 5 is a perspective view of an alternative embodiment of the water drinking bowl portion of the present invention.

Alternatively, the drinking bowl 60A can have an angular top 90 as illustrated in FIG. 4. The drinking bowl 60A can also have a silicone rim 92 to prevent water drips.

The drinking bowl 60A has a generally conical shape with a circumferential top 62A descending through a sidewall to a bottom 64A having an opening 66 which matches the opening of the straw. The bottom exterior wall 68A has mating threads—which mate with the threads 52 of mug 40.

Figure 2:
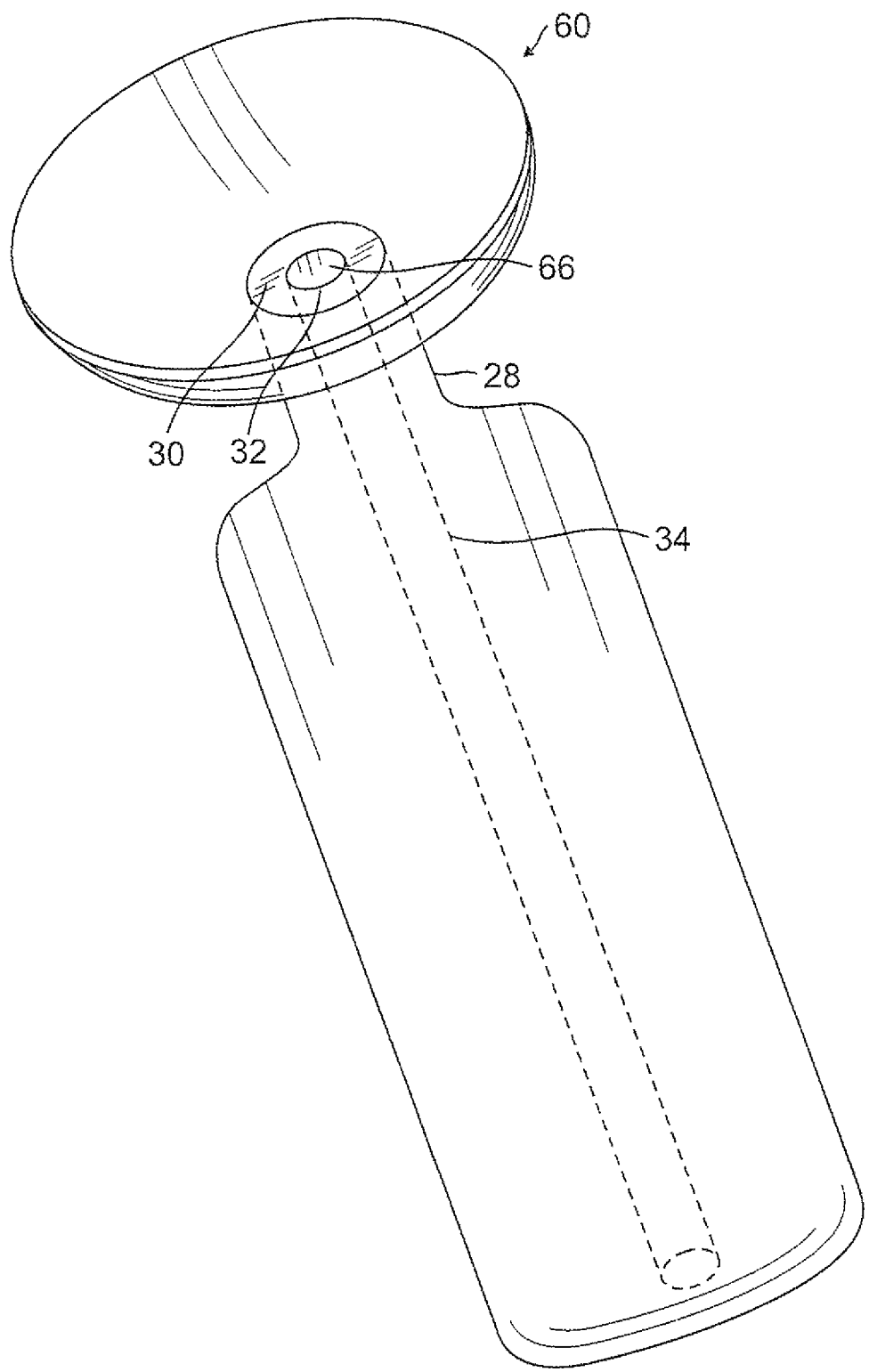
FIG. 2 is a top perspective view illustrating the neck of the squeeze bottle retaining a straw, the neck of the squeeze bottle permanently affixed to the bottom of the drinking bowl, and the opening in the bottom of the drinking bowl drinking bowl aligned with the straw.
Figure 3:
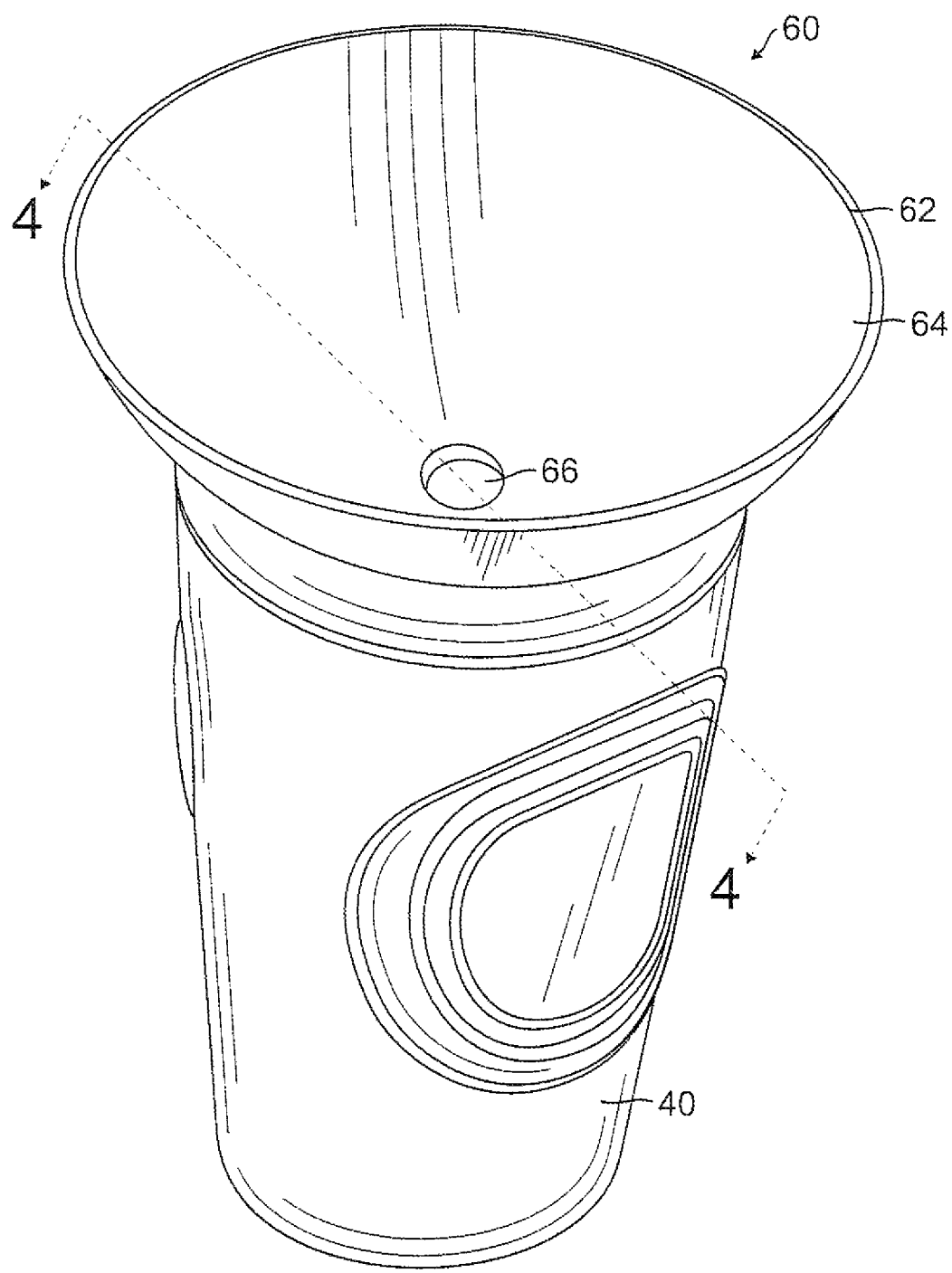
FIG. 3 is a perspective view of the assembled present invention combination water retaining bottle, exterior retaining mug or shell, and water bowl in place.

In an alternative variation of the present invention, the present invention eliminates the outer shell and simply has the squeeze bottle as illustrated in FIG. 2. Specifically, the squeeze bottle 20 is a plastic water bottle having a bottom 22 and a circumferential wall 24 which terminates in a top wall 26 extending to a neck 28 having a closed top 30 with an opening 32 large enough to retain a straw 34 which is press fit retained in the opening. The straw extends into the interior chamber 36 of the squeeze bottle 20, which interior chamber 36 is surrounded by the bottom 22, circumferential wall 24, top wall 26 and neck 28. The top 26 of the neck 28 can be removably affixed by a press fit or mating threaded fit so that the squeeze bottle has an opening sufficiently large to be filled with liquid such as water 100. The drinking bowl 60 has a generally conical shape with a circumferential top 62 descending through a sidewall to a bottom 64 having an opening 66 which matches the opening of the straw 34. The top 26 or neck 28 of the squeeze bottle is removably affixed by a press fit or mating press threaded fit to the bottom of the drinking bowl 60 as best illustrated in FIGS. 2, 3 and 4 so that the device itself does not have to have the exterior shell and is simply a squeeze bottle attached to the drinking bowl. The device is not as attractive as the first embodiment but is a simpler, less expensive device to retain water so that the dog can drink the water when the squeeze bottle is squeezed to cause water to flow into the drinking bowl and then the unconsumed water then is sucked back into the squeeze bottle when the squeeze pressure is released.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A device, comprising:
   a. an interior plastic squeeze bottle having a bottom, a circumferential wall which terminates in a top wall extending to a neck having a closed top with an opening large enough to retain a straw which is press fit retained in the opening, the straw extending into an interior chamber of the squeeze bottle, which interior chamber is surrounded by the bottom circumferential wall, top wall and neck, and means to fill the plastic squeeze bottle with a liquid;
   b. the squeeze bottle is retained within an outer shell having a bottom wall, a circumferential sidewall surrounding an interior chamber into which the plastic squeeze bottle is removably retained in a tight fit manner, a top portion of an exterior wall of the shell having female threads therein, the circumferential sidewall of the shell having a pair of oppositely disposed openings, with a respective flexible cover respectively concealing the oppositely disposed openings, the flexible cover being non-removable but having sufficient flexibility so that a squeezing pressure on the flexible covers transmits a squeezing pressure to the squeeze bottle; and
   c. a drinking bowl having a generally conical shape with a circumferential top descending through a sidewall to a bottom having an opening which matches the opening of the straw, the neck of the drinking bowl attached to the bottom of the drinking bowl and in line with the opening in the bottom of the drinking bowl, an extension of the bottom exterior wall of the bowl having interior mating threads which mate with the threads of the shell so that the drinking bowl is affixed to the outer shell and the opening in the drinking bowl is aligned with the straw, the neck of the squeeze bottle permanently affixed to the bottom of the drinking bowl;
   d. whereby, when the flexible covers are squeezed, the squeezing pressure is transmitted to the sidewall of the plastic squeeze bottle and causes liquid to flow through the straw and into the drinking bowl and remain in the drinking bowl as long as pressure is applied to the circumferential wall of the squeeze bottle and when the pressure is removed, the liquid is sucked back into the squeeze bottle.

2. The device in accordance with claim 1, further comprising a stopper to close the opening in the drinking bowl.

3. The device in accordance with claim 1 further comprising: the drinking bowl including a silicone trim on an upper rim of the drinking bowl.

4. The device in accordance with claim 1, further comprising the drinking bowl having an angular upper rim.

5. The device in accordance with claim 1 further comprising: the liquid is water.

6. The device in accordance with claim 1, further comprising: the shell is made of material selected from the group consisting of plastic and metal.

7. The device in accordance with claim 1, further comprising: the shell is made of material selected from the group consisting of plastic and metal.

8. A device, comprising:
   a. an interior plastic squeeze bottle having a body with an interior chamber to retain a liquid, the body including a circumferential wall and a top having a neck including an opening leading to the interior chamber of the squeeze bottle;
   b. the squeeze bottle is retained within an outer shell having a bottom wall, a circumferential sidewall surrounding an interior chamber into which the plastic squeeze bottle is removably retained in a tight fit manner, the circumferential sidewall having a first retaining mating means, the circumferential sidewall of the shell having a pair of oppositely disposed openings with respective flexible covers through which the circumferential wall of the plastic squeeze bottle is squeezed;
   c. a drinking bowl having a body including a bottom having an opening which matches the opening of the neck of the top of the plastic squeeze bottle, the drinking bowl having a second mating retaining means which engages the first mating retaining means so that the drinking bowl is removably affixed to the shell, the neck of the squeeze bottle permanently affixed to the bottom of the drinking bowl so that the opening in the neck is aligned with the opening in the bottom of the drinking bowl;
   d. whereby a squeeze pressure on the sidewall of the plastic squeeze bottle through the oppositely disposed flexible covers in the shell causes liquid to flow through the opening in the plastic squeeze bottle and into the drinking bowl and remain in the drinking bowl as long as pressure is applied to the circumferential wall of the squeeze bottle and when the pressure is removed, the liquid is sucked back into the squeeze bottle.

9. The device in accordance with claim 8, further comprising:
   a. the opening in the plastic squeeze bottle is large enough to retain a straw which is press fit retained in the opening, the straw extending into the interior chamber of the squeeze bottle.

10. The device in accordance with claim 8, further comprising means to fill the plastic squeeze bottle with a liquid.

11. The device in accordance with claim 8, further comprising a respective cover respectively concealing the oppositely disposed openings in the sidewall of the shell.

12. The device in accordance with claim 8, further comprising the drinking bowl having a generally conical shape with a circumferential top descending through a sidewall to a bottom having an opening which matches the opening of the plastic squeeze bottle.

13. The device in accordance with claim 8, further comprising a stopper to close the opening in the drinking bowl.

14. The device in accordance with claim 8 further comprising: the drinking bowl including a silicone trim on an upper rim of the drinking bowl.

15. The device in accordance with claim 8, further comprising the drinking bowl having an angular upper rim.

16. The device in accordance with claim 8, further comprising: the liquid is water.

17. The device in accordance with claim 9, further comprising: the shell is made of material selected from the group consisting of plastic and metal.

18. A device, comprising:
   a. an interior squeeze bottle having a body with an interior chamber to retain a liquid, the body including a circumferential wall and a top having an opening;
   b. the squeeze bottle is retained within an outer shell having a bottom wall, a circumferential sidewall surrounding an interior chamber into which the squeeze bottle is removably retained in a tight fit manner, the circumferential sidewall having a first retaining means, the circumferential sidewall of the shell having means to gain access to the squeeze bottle in order to apply pressure to the circumferential wall of the squeeze bottle;
   c. a drinking bowl having a body including a bottom having an opening which matches the opening of the top of the squeeze bottle, the drinking bowl having a second retaining means which engages the first retaining means so that the drinking bowl is removably affixed to the shell;
   d. whereby a squeeze pressure on the sidewall of the squeeze bottle causes liquid to flow through the opening in the squeeze bottle and into the drinking bowl and remain in the drinking bowl as long as pressure is applied to the circumferential wall of the squeeze bottle and when the pressure is removed, the liquid is sucked back into the squeeze bottle.

19. The device in accordance with claim 18, further comprising:
   a. the opening in the squeeze bottle is large enough to retain a straw which is press fit retained in the opening, the straw extending into the interior chamber of the squeeze bottle and aligned with the opening in the bottom of the drinking bowl.

20. The device in accordance with claim 18, further comprising means to fill the squeeze bottle with a liquid.

21. The device in accordance with claim 18, further comprising the drinking bowl having a generally conical shape with a circumferential top descending through a sidewall to a bottom having an opening which matches the opening of the plastic squeeze bottle.

22. The device in accordance with claim 18, further comprising a stopper to close the opening in the drinking bowl.

23. The device in accordance with claim 18 further comprising: the drinking bowl including a silicone trim on an upper rim of the drinking bowl.

24. The device in accordance with claim 18, further comprising the drinking bowl having an angular upper rim.

25. The device in accordance with claim 18 further comprising: the liquid is water.

* * * * *